United States Patent
Vajravel et al.

(10) Patent No.: US 12,292,963 B2
(45) Date of Patent: May 6, 2025

(54) AUTOMATICALLY GROUPING APPLICATIONS IN A SECURE WORKSPACE ENVIRONMENT

(71) Applicant: Dell Products L.P., Round Rock, TX (US)

(72) Inventors: Gokul Thiruchengode Vajravel, Bangalore (IN); Srinivasa Ragavan Rajagopalan, Bangalore (IN); Ankit Kumar, Jharkhand (IN)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 18/051,664

(22) Filed: Nov. 1, 2022

(65) Prior Publication Data
US 2024/0143733 A1    May 2, 2024

(51) Int. Cl.
| G06F 21/51 | (2013.01) |
| G06F 15/16 | (2006.01) |
| G06F 21/53 | (2013.01) |
| H04L 9/32  | (2006.01) |
| H04L 9/40  | (2022.01) |
| H04L 15/16 | (2006.01) |

(52) U.S. Cl.
CPC .............. *G06F 21/51* (2013.01); *G06F 21/53* (2013.01); *G06F 2221/033* (2013.01)

(58) Field of Classification Search
CPC ..... G06F 21/51; G06F 21/53; G06F 2221/033
USPC .......................................................... 726/1
See application file for complete search history.

(56) References Cited

U.S. PATENT DOCUMENTS

| 8,769,268 B2 * | 7/2014 | Morozov | G06F 21/74 718/107 |
| 9,558,348 B1 * | 1/2017 | Muttik | G06Q 50/00 |
| 10,437,439 B1 * | 10/2019 | Kurani | G06F 21/629 |
| 2004/0064704 A1 * | 4/2004 | Rahman | G06F 16/51 707/E17.031 |
| 2007/0101435 A1 * | 5/2007 | Konanka | G06F 21/57 713/193 |
| 2010/0024036 A1 * | 1/2010 | Morozov | G06F 21/53 726/26 |
| 2010/0281061 A1 * | 11/2010 | Chen | G06F 16/2365 707/794 |

(Continued)

OTHER PUBLICATIONS

Shanmugam, Karthikeyan, Using Docker Application Packages to Deliver Apps Across Teams, online article, Oct. 22, 2019, InfoQ, https://www.infoq.com/articles/docker-application-packages-cnab/, accessed on Oct. 3, 2022.

(Continued)

*Primary Examiner* — Emmanuel L Moise
*Assistant Examiner* — Berhanu Shitayewoldetadik
(74) *Attorney, Agent, or Firm* — Kirton McConkie; Brian Tucker

(57) ABSTRACT

Applications can be automatically grouped in a secure workspace environment. An application organizer service can be deployed on a user computing device to intelligently group applications within secure workspaces based on resource requirements, peripheral usage, threat level and/or data sharing characteristics of the applications. The application organizer service may determine these characteristics in a variety of ways including through the monitoring of the applications as they execute inside the secure workspaces.

19 Claims, 15 Drawing Sheets

(56) References Cited

U.S. PATENT DOCUMENTS

| | | | | |
|---|---|---|---|---|
| 2012/0102050 | A1* | 4/2012 | Button | G06N 5/022 |
| | | | | 707/E17.014 |
| 2012/0311475 | A1* | 12/2012 | Wong | G06F 11/328 |
| | | | | 715/772 |
| 2014/0289261 | A1* | 9/2014 | Shivakumar | G06Q 10/101 |
| | | | | 707/748 |
| 2014/0344446 | A1* | 11/2014 | Rjeili | H04L 43/04 |
| | | | | 709/224 |
| 2014/0359170 | A1* | 12/2014 | Hutchings | G06F 13/385 |
| | | | | 710/8 |
| 2017/0024293 | A1* | 1/2017 | Bell | G06F 11/3495 |
| 2017/0142076 | A1* | 5/2017 | Ford | H04L 63/083 |
| 2017/0244658 | A1* | 8/2017 | Celone | H04L 51/063 |
| 2018/0039776 | A1* | 2/2018 | Loman | G06F 21/566 |
| 2019/0097970 | A1* | 3/2019 | Coleman | H04L 63/0236 |
| 2019/0098019 | A1* | 3/2019 | Coleman | G06F 21/53 |
| 2019/0121961 | A1* | 4/2019 | Coleman | H04L 63/0227 |
| 2019/0121962 | A1* | 4/2019 | Coleman | H04L 63/083 |
| 2019/0121963 | A1* | 4/2019 | Coleman | H04L 63/101 |
| 2020/0159915 | A1* | 5/2020 | Klonowski | G06F 21/54 |
| 2021/0233638 | A1* | 7/2021 | Moskal | G16H 40/20 |
| 2021/0398081 | A1* | 12/2021 | Gaty | G06Q 10/105 |
| 2022/0004623 | A1* | 1/2022 | Trabelsi | H04L 63/029 |
| 2022/0075868 | A1* | 3/2022 | Loman | G06F 21/54 |
| 2022/0091726 | A1* | 3/2022 | Azmoon | G06N 20/00 |
| 2022/0357977 | A1* | 11/2022 | Kalou | G06Q 10/10 |
| 2023/0418952 | A1* | 12/2023 | Das | G06F 21/577 |
| 2024/0143733 | A1* | 5/2024 | Vajravel | G06F 21/53 |

OTHER PUBLICATIONS

CNAB, Cloud Native Application Bundle, website, DeisLabs, https://cnab.io/, accessed on Oct. 3, 2022.

* cited by examiner

User Computing Device 100

Secure Workspace Coordinator 132b | 132

② Secure workspace coordinator 132 determines a recommended secure workspace for each application based on the application's resource utilization

| App | Network | GPU | TPM | VPN | Recommended SW |
|---|---|---|---|---|---|
| 121 | Any latency | Low | None | None | Software container |
| 122 | Medium latency | Medium | Only during initialization | Medium traffic | Software container with peripherals |
| 123 | Low latency | High | Continuous Access | Continuous Access | VM with virtualized peripherals |
| 124 | Any latency | Low | None | None | Software container |
| 125 | Any latency | Medium | Only during initialization | None | Software container with peripherals |
| 126 | Low latency | High | Continuous Access | Continuous Access | VM with virtualized peripherals |
| ... | | | | | |

*FIG. 3B*

AUTOMATICALLY GROUPING APPLICATIONS IN A SECURE WORKSPACE ENVIRONMENT

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine, a software-based container, a virtual desktop infrastructure, or a cloud container. An application hosted in a secure workspace will be isolated from resources in the external environment and from other applications or services hosted external to the secure workspace, including native applications and applications hosted in other secure workspaces.

Multiple applications may be grouped in a secure workspace. However, such groupings of applications are performed manually. For example, an administrator may manually configure a virtual machine to host multiple applications. When multiple secure workspaces are concurrently used to host applications, various difficulties may arise. For example, if applications hosted in different secure workspaces need access to the same resources (e.g., peripherals, system resources, etc.), resource performance can be greatly diminished due to the overhead of the resource sharing service that is necessary to provide resource access to the secure workspaces.

BRIEF SUMMARY

The present invention extends to systems, methods and computer program products for automatically grouping applications in a secure workspace environment. An application organizer service can be deployed on a user computing device to intelligently group applications within secure workspaces based on resource requirements, peripheral usage, threat level and/or data sharing characteristics of the applications. The application organizer service may determine these characteristics in a variety of ways including through the monitoring of the applications as they execute inside the secure workspaces.

In some embodiments, the present invention may be implemented as a method for automatically grouping applications in a secure workspace environment. Applications to be deployed in secure workspaces on a user computing device can be identified. It can be determined which peripherals the applications use. The applications can be grouped into two or more groups based on the peripherals that the applications use. Each of the two or more groups can be deployed in a separate secure workspace based on the peripherals that the applications use.

In some embodiments, the present invention may be implemented as computer storage media storing computer executable instructions which when executed implement a method for automatically grouping applications in a secure workspace environment. Resource utilization of applications executing on a user computing device can be monitored. Based on the resource utilization, recommended secure workspaces for the applications can be determined. The applications can be grouped into two or more groups based on the recommended secure workspaces. Each of the two or more groups can then be deployed in the corresponding recommended secure workspace.

In some embodiments, the present invention may be implemented as a user computing device that includes one or more processors and computer storage media storing computer executable instructions which when executed implement a method for automatically grouping applications in a secure workspace environment. Applications that are executing on the user computing device can be identified. Trust characteristics of the applications can be determined. Trust rankings can be selected for the applications based on the trust characteristics. The applications can be grouped into two or more groups based on the trust rankings. Each of the two or more groups can be deployed in a separate secure workspace based on the trust rankings.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3D provide another example of how applications can be automatically grouped in a secure workspace environment in accordance with embodiments of the present invention.

DETAILED DESCRIPTION

Figure 1:
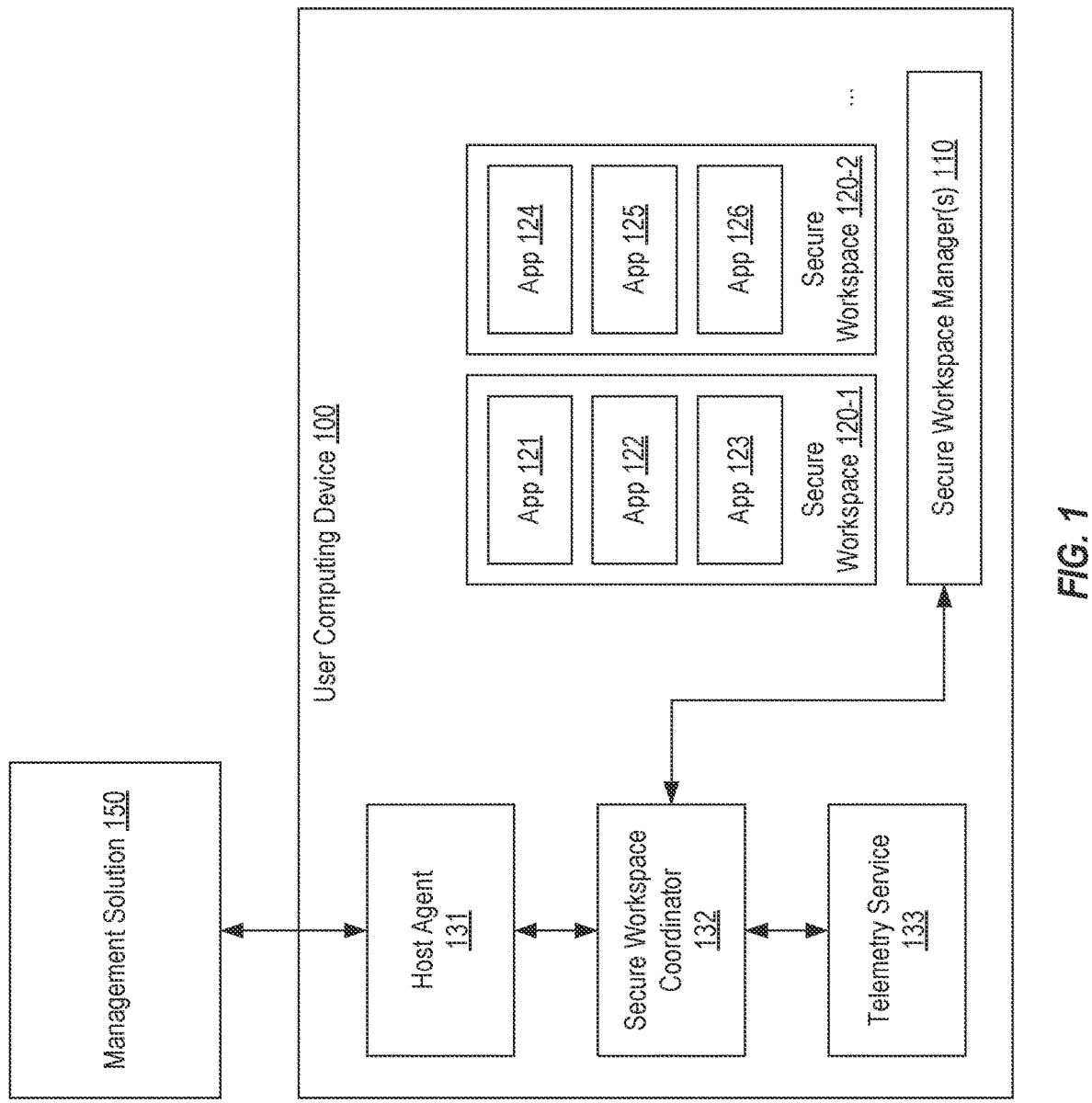
FIG. 1 provides an example of a computing environment in which embodiments of the present invention may be implemented.

FIG. 1 provides an example of a computing environment in which one or more embodiments of the present invention may be implemented. This computing environment includes a user computing device 100 and a management solution 150 which is used to manage user computing device 100. Although only a single user computing device 100 is shown, management solution 150 would typically be used to manage a large number of user computing devices, any or all of which could be configured in the same manner as user computing device 100 to thereby allow the automatic grouping of applications in a secure workspace environment in accordance with embodiments of the present invention.

User computing device 100 is shown as having one or more secure workspace managers 110. A secure workspace manager is intended to represent the components on user computing device 100 that allow secure workspaces to be deployed. For example, a secure workspace manager may be a hypervisor (e.g., Hyper-V) when virtual machines are used to implement secure workspaces, a container daemon when containers (e.g., Docker containers) are used to implement secure workspaces, a sandbox manager when sandboxes (e.g., Sandboxie isolated environments) are used to implement secure workspaces, a Webapp manager when a browser sandbox is used to implement secure workspaces, etc. In the depicted example, it is assumed that two secure workspaces 120-1 and 120-2 are deployed on user computing device 100. However, there could be any number and/or type of secure workspaces at any given time. Secure workspace 120-1 is shown as hosting applications 121, 122, and 123, and secure workspace 120-2 is shown as hosting applications 124, 125, and 126. However, a secure workspace could host any number of applications at any given time. Although not shown, each secure workspace may include a workspace agent that can monitor activities and status within the secure workspace and report such information to secure workspace coordinator 132.

Although not shown, user computing device 100 includes an operating system which can be considered the base operating system to distinguish it from an operating system inside any of the secure workspaces (e.g., inside a virtual machine). Some or all the secure workspaces could run in the context of the base operating system (e.g., when the secure workspace is a software container) and/or some or all the secure workspaces could run in separate virtual machines.

User computing device 100 includes a host agent 131 that can be configured to implement management services on user computing device 100. For example, host agent 131 may interface with management solution 150 to identify and/or receive applications that should be deployed on user computing device 100 in secure workspaces.

User computing device 100 also includes a secure workspace coordinator 132 which can represent one or more services or other components that are configured to coordinate the deployment of secure workspaces including the organization of applications within the secure workspaces. For example, secure workspace coordinator 132 may interface with host agent 131 to receive applications that are to be made available on user computing device 100 and can interface with secure workspace manager(s) 110 to deploy secure workspaces in which the applications may be hosted. In accordance with embodiments of the present invention, secure workspace coordinator 132 can be configured to automatically group the applications in the secure workspaces to enhance the user's experience.

User computing device 100 further includes a telemetry service 133 that can be configured to monitor the secure workspaces' resource utilization. Telemetry workspace coordinator 132 can notify secure workspace coordinator 132 of the resource utilization to allow secure workspace coordinator 132 to automatically group applications within the secure workspaces based on the resource utilization.

FIGS. 2A-2D provide an example of how applications can be automatically grouped in a secure workspace environment in accordance with embodiments of the present invention. In this example, the applications are grouped based on peripheral usage.

Figure 2A:
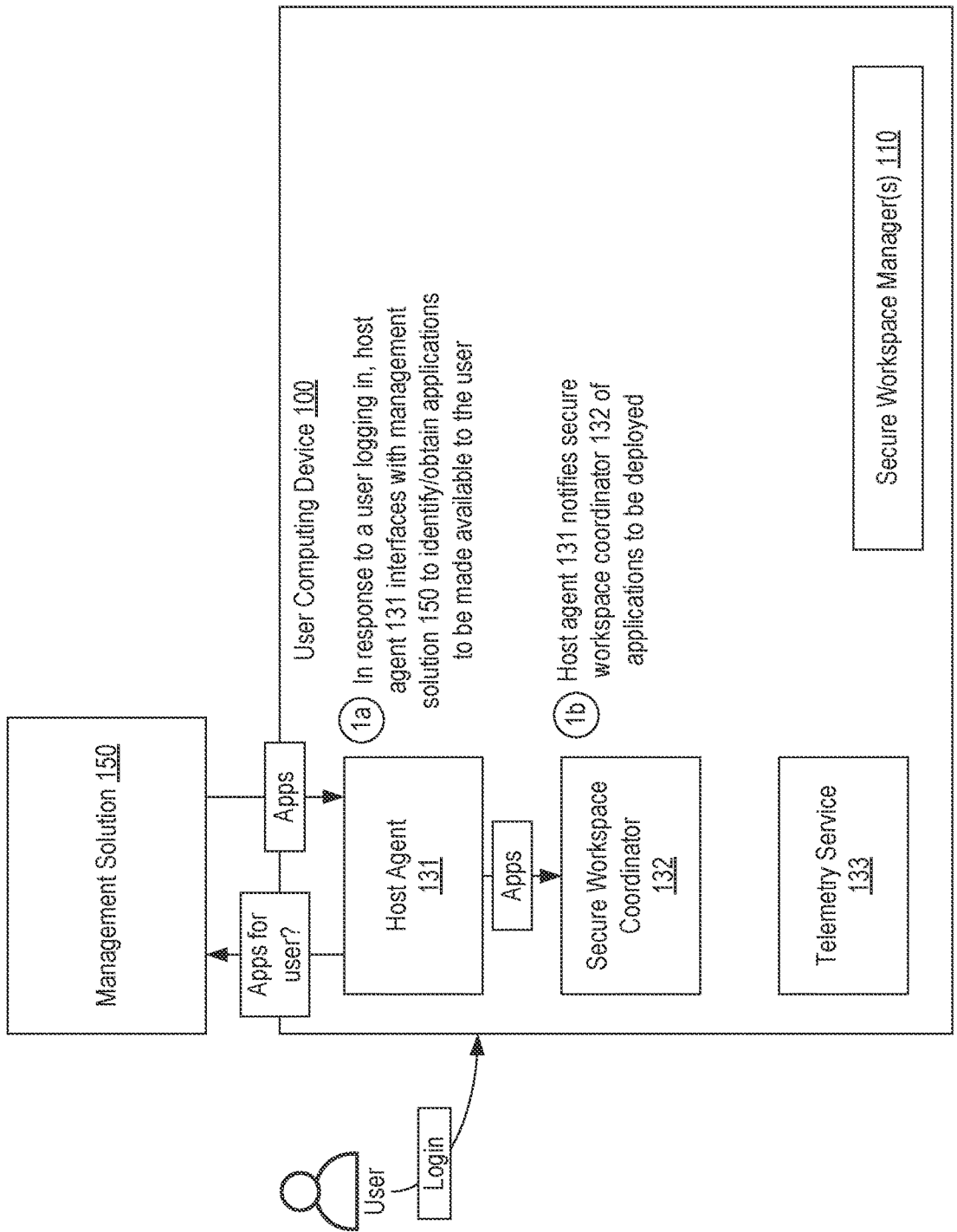
FIGS. 2A-2D provide an example of how applications can be automatically grouped in a secure workspace environment in accordance with embodiments of the present invention.

Turning to FIG. 2A, it is assumed that a user has logged in to user computing device 100. In step 1a, and in response to the user logging in, host agent 131 can interface with management service 150 to identify and/or obtain applications that are to be made available to the user while logged in to user computing device 100. In some embodiments, management solution 150 may provide the applications to host agent 131, whereas in other embodiments, user computing device 100 may already store the applications or otherwise have access to the applications. In any case, in step 1b, host agent 131 can notify secure workspace coordinator 132 of the applications that are to be deployed on user computing device 100. For purposes of this example, it is assumed that host agent 131 obtains applications 121-126 from management solution 150 and notifies secure workspace coordinator 132 of these applications.

Figure 2B:
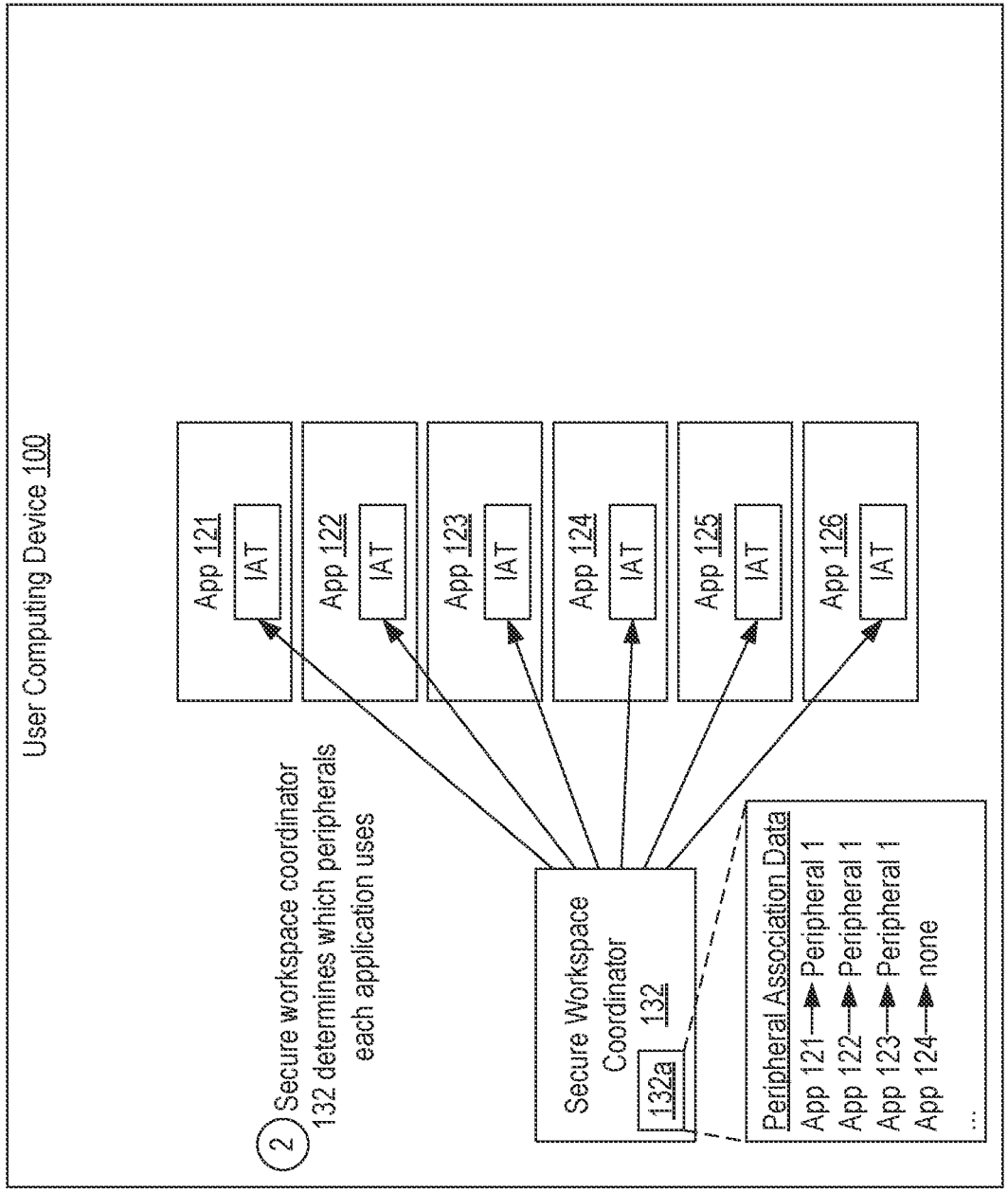

Turning to FIG. 2B, in step 2, secure workspace coordinator 132 can determine which peripherals each of the applications use. For example, secure workspace coordinator 132 may inspect the import address table (IAT) of each of applications 121-126 to identify libraries used by the applications and whether such libraries are associated with any peripherals (e.g., a library for accessing a webcam and/or a microphone). As part of determining which peripherals the applications use, secure workspace coordinator 132 can create and store peripheral association data 132a for each application. In this example, it is assumed that secure workspace coordinator 132 creates peripheral association data 132a that associates peripheral 1 with applications 121, 122, and 123 and does not associate a peripheral with applications 124, 125, and 126. In other words, secure workspace coordinator 132 determines that applications 121, 122, and 123 access the same peripheral and that applications 124, 125, and 126 do not access any peripherals.

Figure 2C:
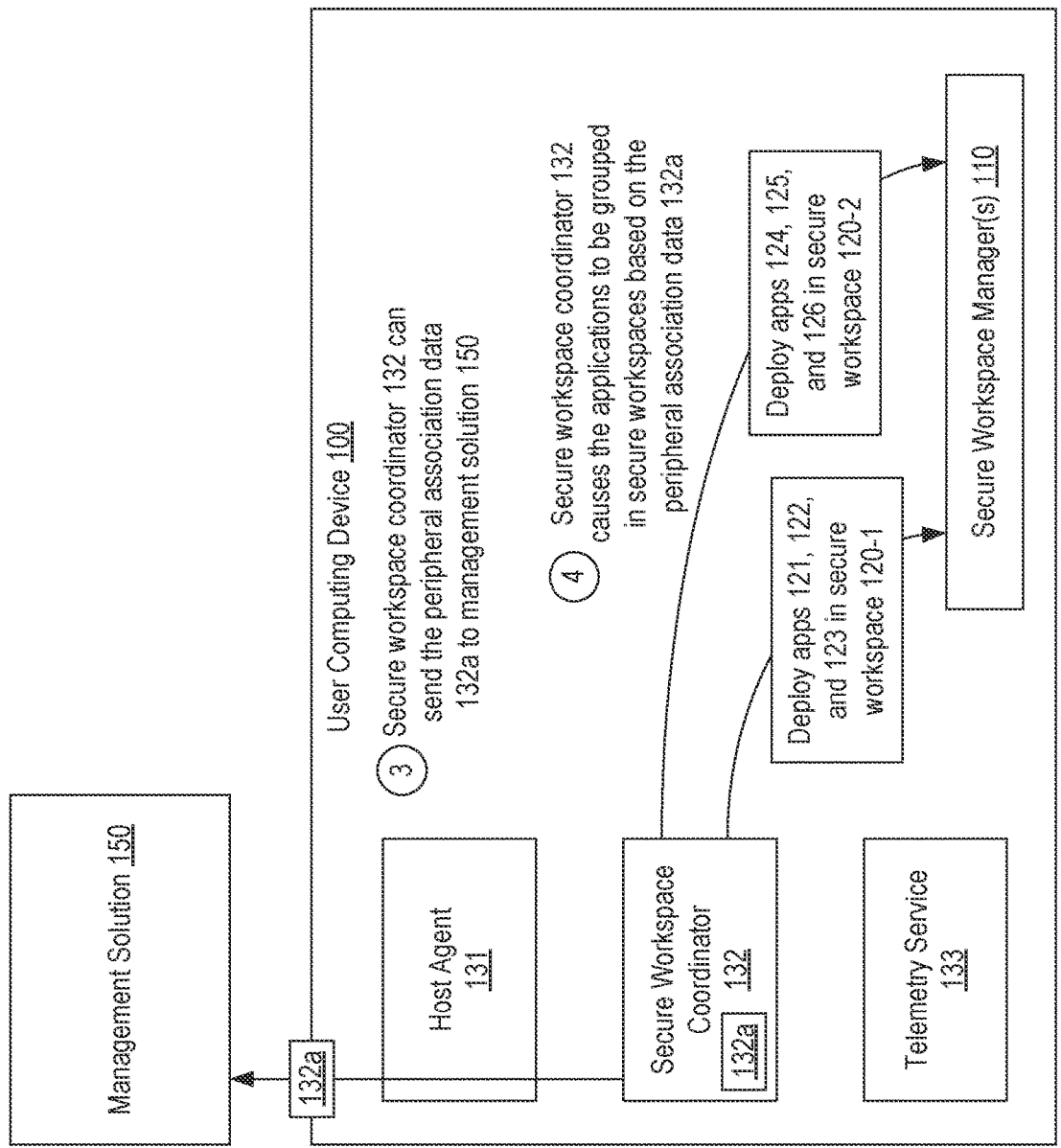

Turning to FIG. 2C, in step 3, secure workspace coordinator 132 can send the peripheral association data 132a to management solution 150 (e.g., via host agent 131) so that management solution 150 may provide peripheral association data 132a to secure workspace coordinator 132 during a subsequent boot of user computing device 100 and/or to an instance of secure workspace coordinator 132 running on another user computing device 100 on which the same or similar set of applications be may deployed.

In step 4, secure workspace coordinator 132 can cause the applications to be grouped in secure workspaces based on the peripheral association data 132a. For example, because applications 121, 122, and 123 are each determined to use peripheral 1, secure workspace coordinator 132 can interface with secure workspace manager(s) 110 to cause applications 121, 122, and 123 to be deployed together in secure workspace 120-1. Similarly, because applications 124, 125, and 126 are each determined to not use a peripheral, secure workspace coordinator 132 can interface with secure workspace manager(s) 110 to cause applications 124, 125, and 126 to be deployed together in secure workspace 120-2.

Figure 2D:
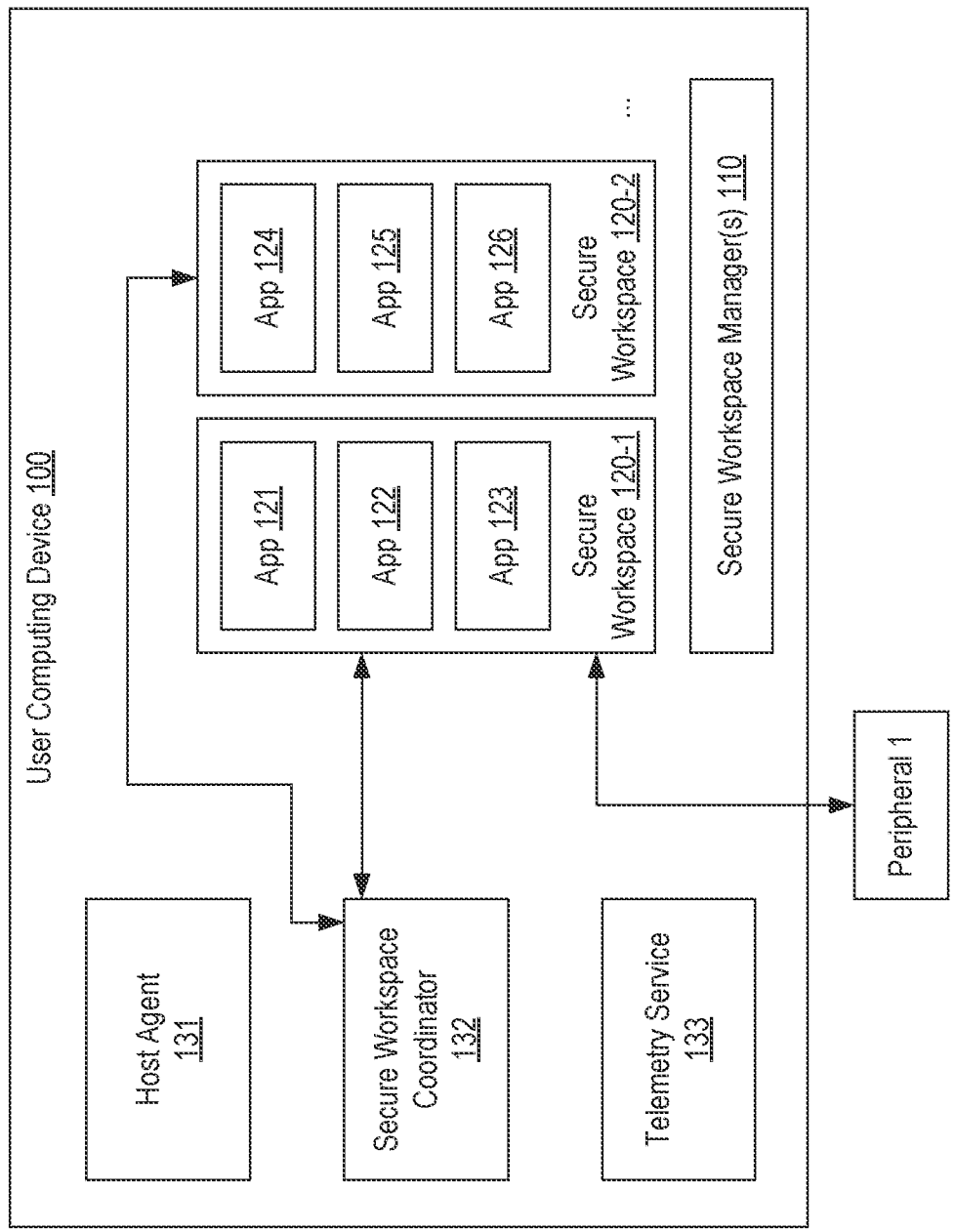

Turning to FIG. 2D, secure workspaces 120-1 and 120-2 have now been deployed on user computing device 100. The deployment of secure workspace 120-1 entails enabling peripheral 1 to be accessed from within secure workspace 120-1. In contrast, the deployment of secure workspace 120-2 does not entail enabling access to peripheral 1 or any other peripheral. As a result, the overhead of deploying and maintaining secure workspaces 120-1 and 120-2 is reduced relative to a scenario where applications 121, 122, and 123 are distributed among multiple secure workspaces. Also, in FIG. 2D, secure workspace coordinator 132 is shown as monitoring secure workspaces 120-1 and 120-2 such as by communicating with a workspace agent running inside each secure workspace. This monitoring can include determining if the peripheral requirements of any of the applications has changed and migrating an application accordingly. For example, if the user configured application 124 to use peripheral 1, secure workspace coordinator 132 could migrate application 124 to secure workspace 120-1 as opposed to configured secure workspace 120-2 to enable application 124 to access peripheral 1. This grouping based on peripheral requirements can be performed whenever applications are configured to access the same or similar set of peripherals.

FIGS. 3A-3D provide another example of how applications can be automatically grouped in a secure workspace environment in accordance with embodiments of the present invention. In this example, the applications are grouped based on resource utilization.

Figure 3A:
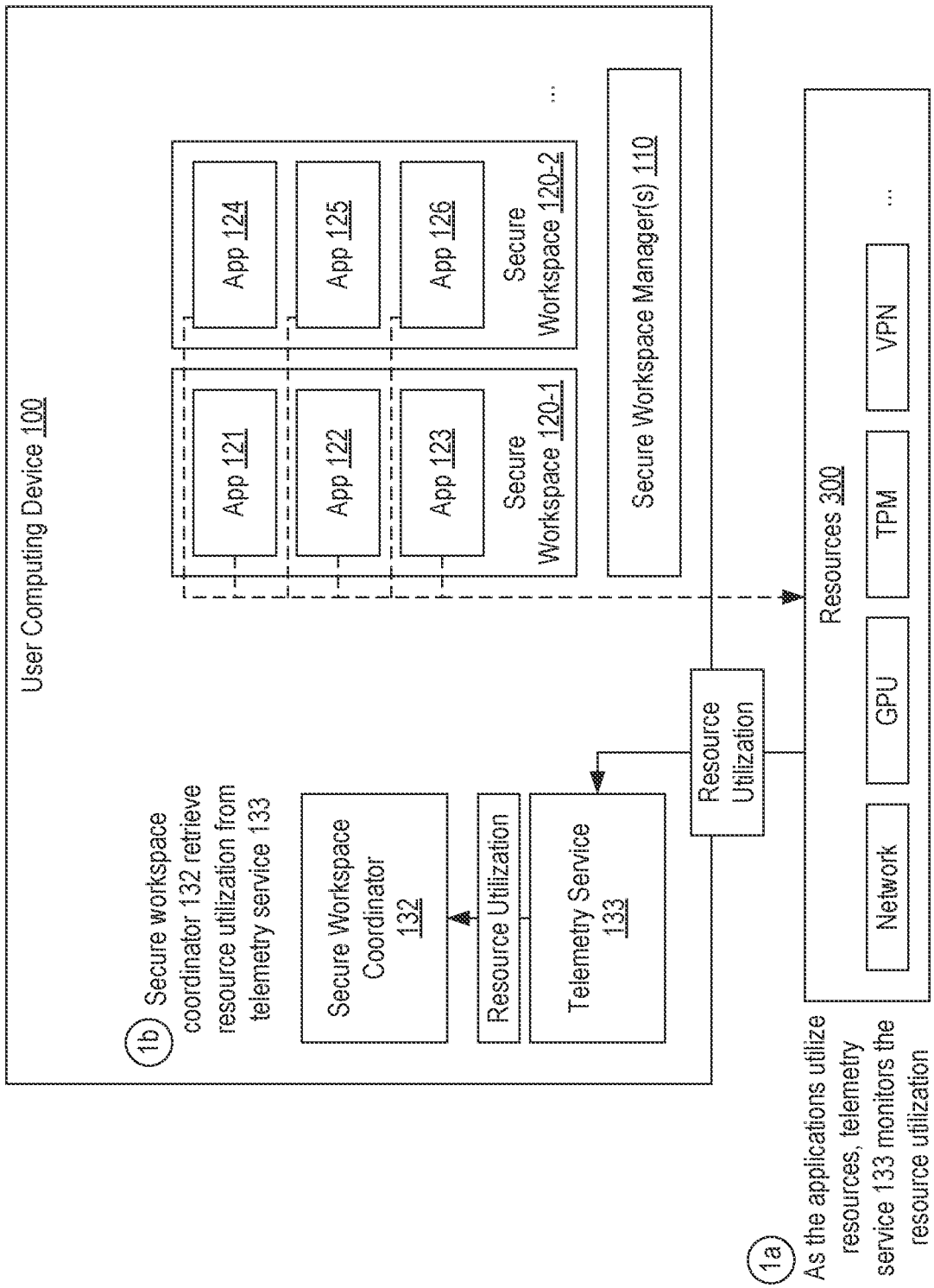

Turning to FIG. 3A, it is assumed that applications 121, 122, and 123 are being hosted in secure workspace 120-1 and that applications 124, 125, and 126 are being hosted in secure workspace 120-2. This grouping of the applications could have been a result of the peripheral-based grouping described in FIGS. 2A-2D but could be a result of any other configuration. Also, any other grouping of applications could initially exist. Of importance is that the applications are running on user computing device 100 in some manner to allow their resource utilization to be monitored.

In step 1a, and as the applications utilize resources 300, telemetry service 133 can monitor the resource utilization. As shown, resources 300 could include network resources, a graphics processing unit (GPU), a trusted platform module (TPM), a virtual private network (VPN), or any other resource that may be available on user computing device 100. In step 1b, secure workspace coordinator 132 can retrieve the resource utilization from telemetry service 133.

Turning to FIG. 3B, secure workspace coordinator 132 can use the resource utilization of applications 121-126 to determine a recommended secure workspace for each application. For example, secure workspace coordinator 132 could create resource-based secure workspace recommendations 132b. As shown, resource-based secure workspace recommendations 132b could identify how an application utilizes each resource and define a recommended type of secure workspace based on the utilization. As one example, application 121 is assumed to function properly with any network latency, to have a low utilization of the GPU, and to not use the TPM or the VPN, and in such a case, secure workspace coordinator 132 may select a software container as the type of secure workspace in which application 121 should be hosted. In the depicted example, it is assumed that secure workspace coordinator 132 selects a software container for applications 121 and 124, a software container with peripheral access for applications 122 and 125, and a virtual machine with virtualized peripherals for applications 123 and 126.

Figure 3C:
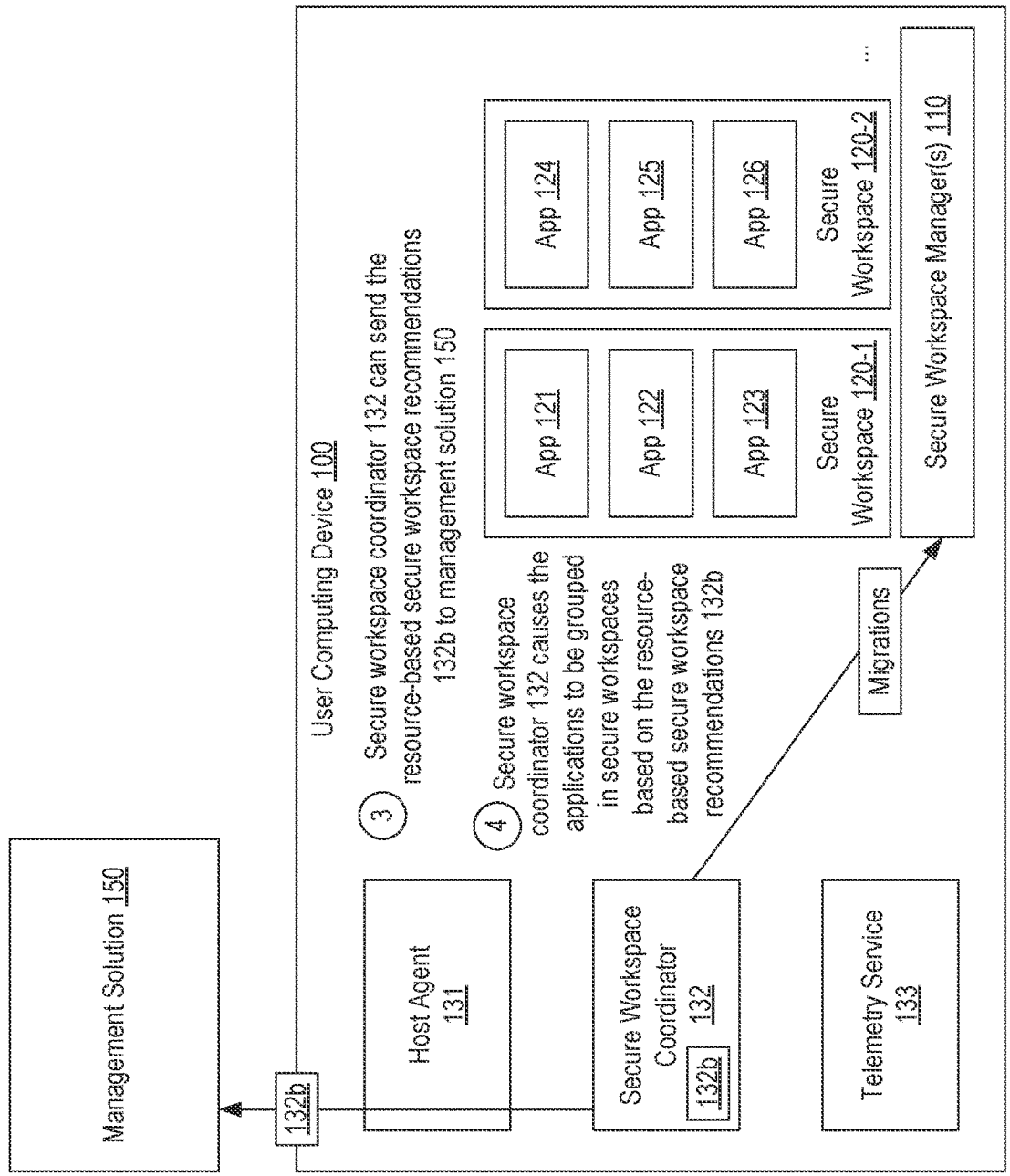

Turning to FIG. 3C, in step 3, secure workspace coordinator 132 can send the resource-based secure workspace recommendations 132b to management solution 150 (e.g., via host agent 131) so that management solution 150 may provide resource-based secure workspace recommendations 132b to secure workspace coordinator 132 during a subsequent boot of user computing device 100 and/or to an instance of secure workspace coordinator 132 running on another user computing device 100 on which the same or similar set of applications be may deployed.

In step 4, secure workspace coordinator 132 can cause the applications to be grouped in secure workspaces based on the resource-based secure workspace recommendations 132b. For example, because applications 121 and 124 each are recommended to be run in a similarly-configured software container, secure workspace coordinator 132 can interface with secure workspace manager(s) 110 to cause applications 121 and 124 to be deployed together in secure workspace 120-1. Similarly, because applications 122 and 125 are recommended to be run in a similarly-configured software container, secure workspace coordinator 132 can interface with secure workspace manager(s) 110 to cause applications 122 and 125 to be deployed together in secure workspace 120-2. Additionally, because applications 123 and 126 are recommended to be run in a similarly-configured virtual machine, secure workspace coordinator 132 can interface with secure workspace manager(s) 110 to cause applications 123 and 126 to be deployed together in secure workspace 120-3. This grouping may be accomplished immediately, such as by migrating the applications to the appropriate secure workspace, or at the next servicing, such as by including the applications when the appropriate secure workspace is created or restarted.

Figure 3D:
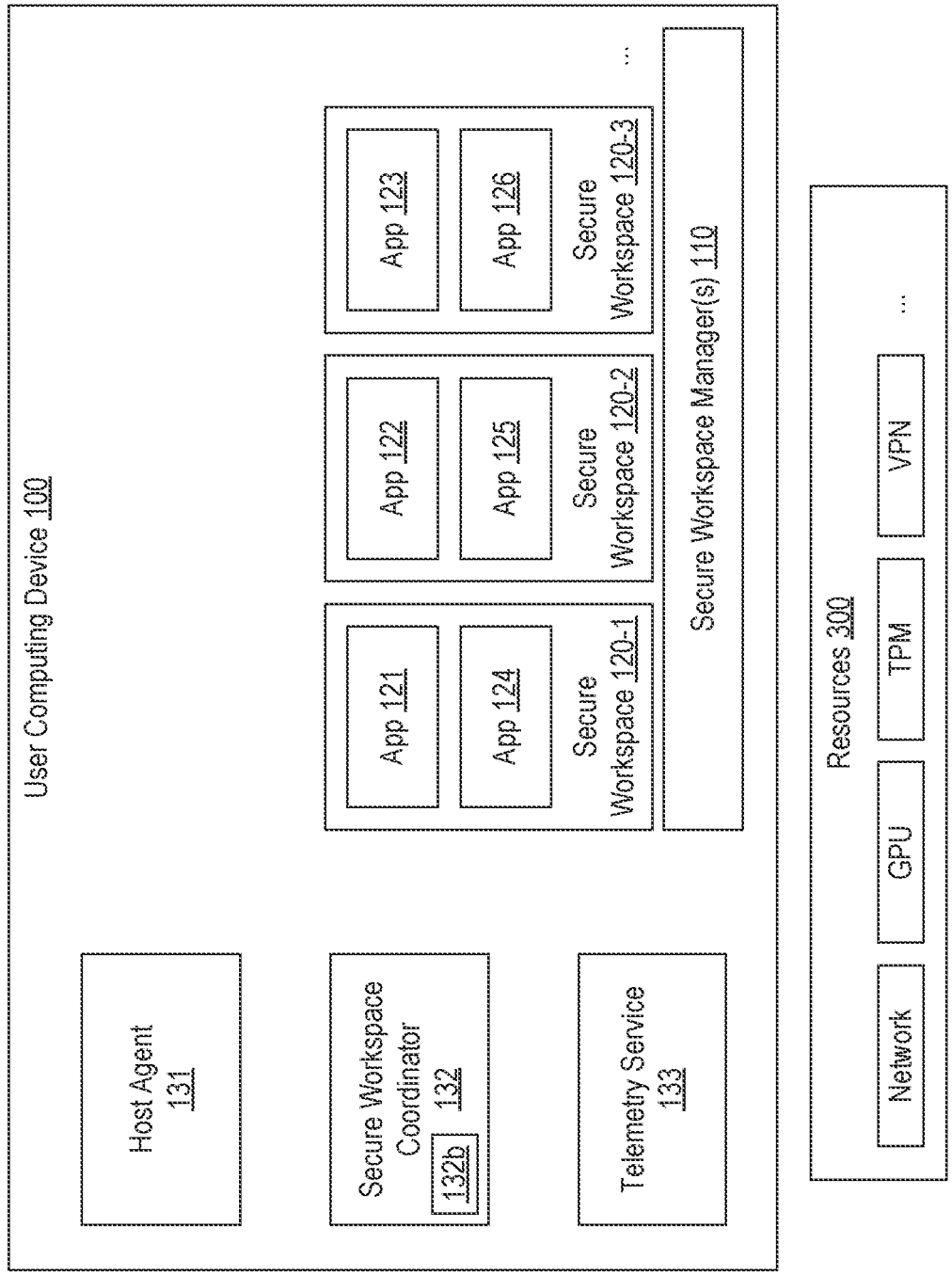

Turning to FIG. 3D, each of applications 121-126 are now grouped in the secure workspace in accordance with the resource-based secure workspace recommendations 132b. Although not shown, telemetry service 133 can continue to monitor resource utilization to thereby allow secure workspace coordinator 132 to refine the resource-based secure workspace recommendations 132b as appropriate.

FIGS. 4A-4F provide another example of how applications can be automatically grouped in a secure workspace environment in accordance with embodiments of the present invention. In this example, the applications are grouped based on trust.

Figure 4A:
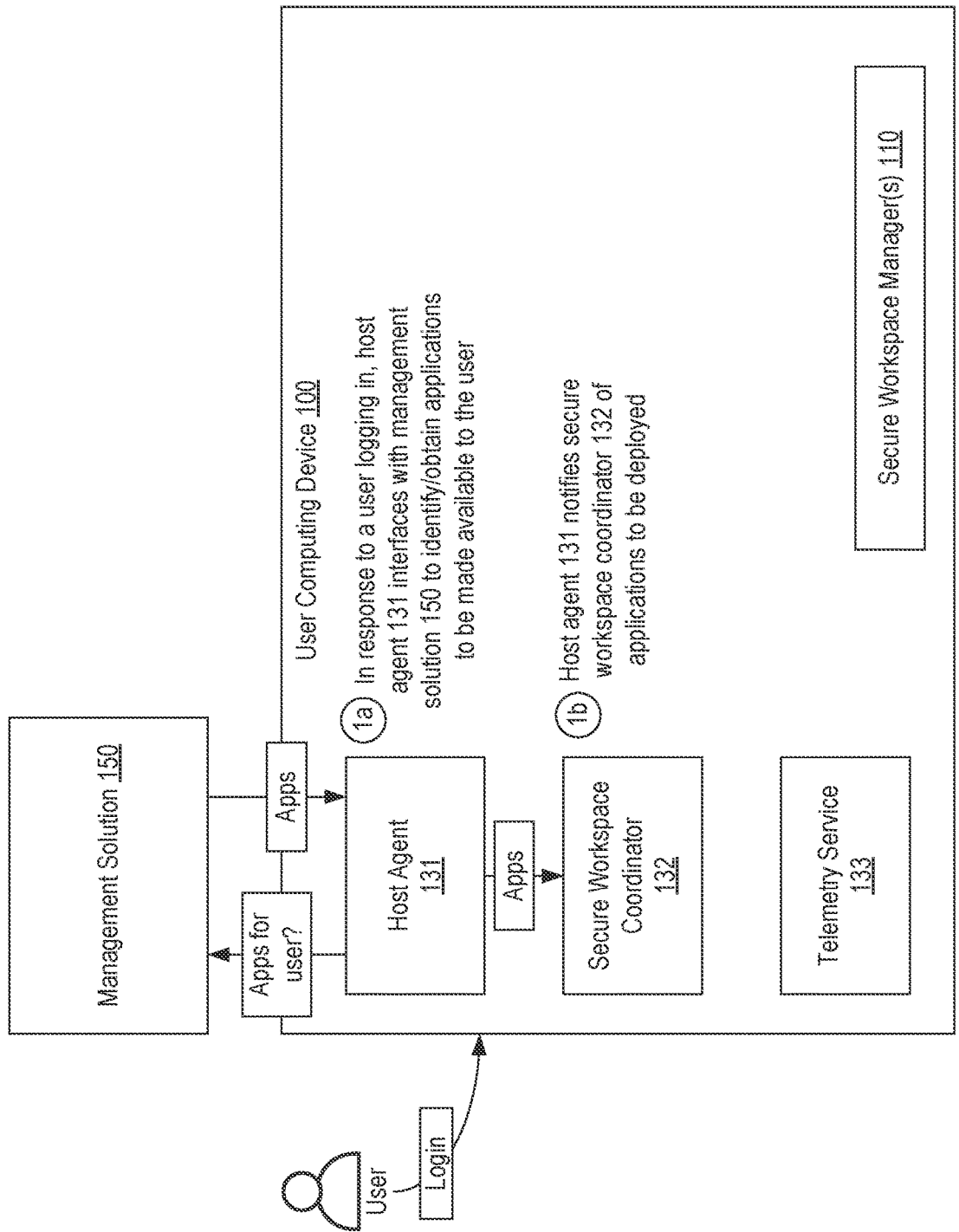
FIGS. 4A-4F provide a further example of how applications can be automatically grouped in a secure workspace environment in accordance with embodiments of the present invention.

Turning to FIG. 4A, it is assumed that a user has logged in to user computing device 100. In step 1a, and in response to the user logging in, host agent 131 can interface with management service 150 to identify and/or obtain applications that are to be made available to the user while logged in to user computing device 100. In step 1b, host agent 131 can notify secure workspace coordinator 132 of the applications that are to be deployed on user computing device 100.

Figure 4B:
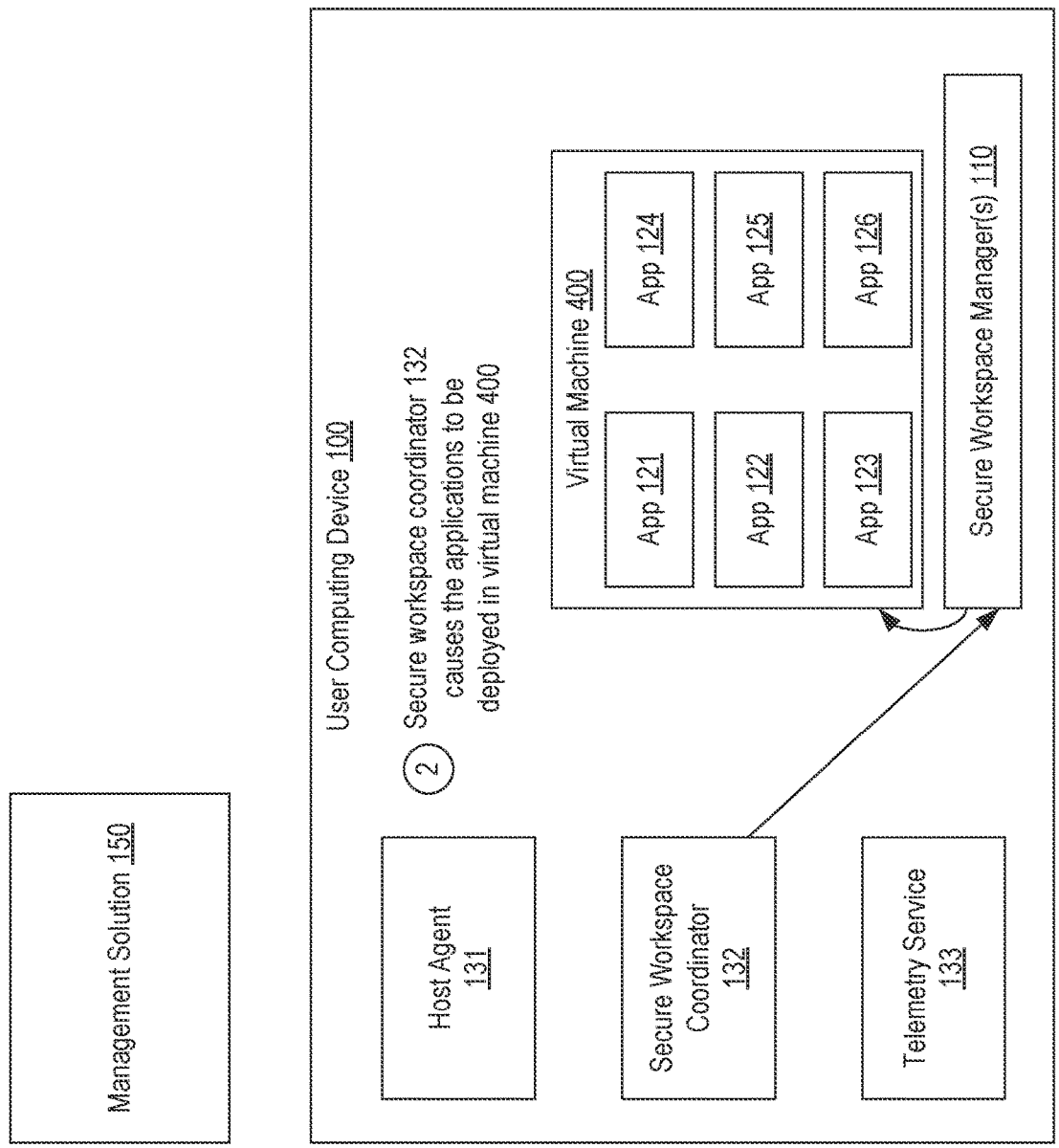

Turning to FIG. 4B, in step 2, secure workspace coordinator 132 can cause each of the applications to be deployed in a virtual machine 400 (or possibly multiple virtual machines). This initial deployment of the applications within a virtual machine can ensure minimal risk as the trust of each application is being evaluated. However, in some embodiments, the applications could be initially deployed in other types of secure workspaces or even natively to evaluate their trust.

Figure 4C:
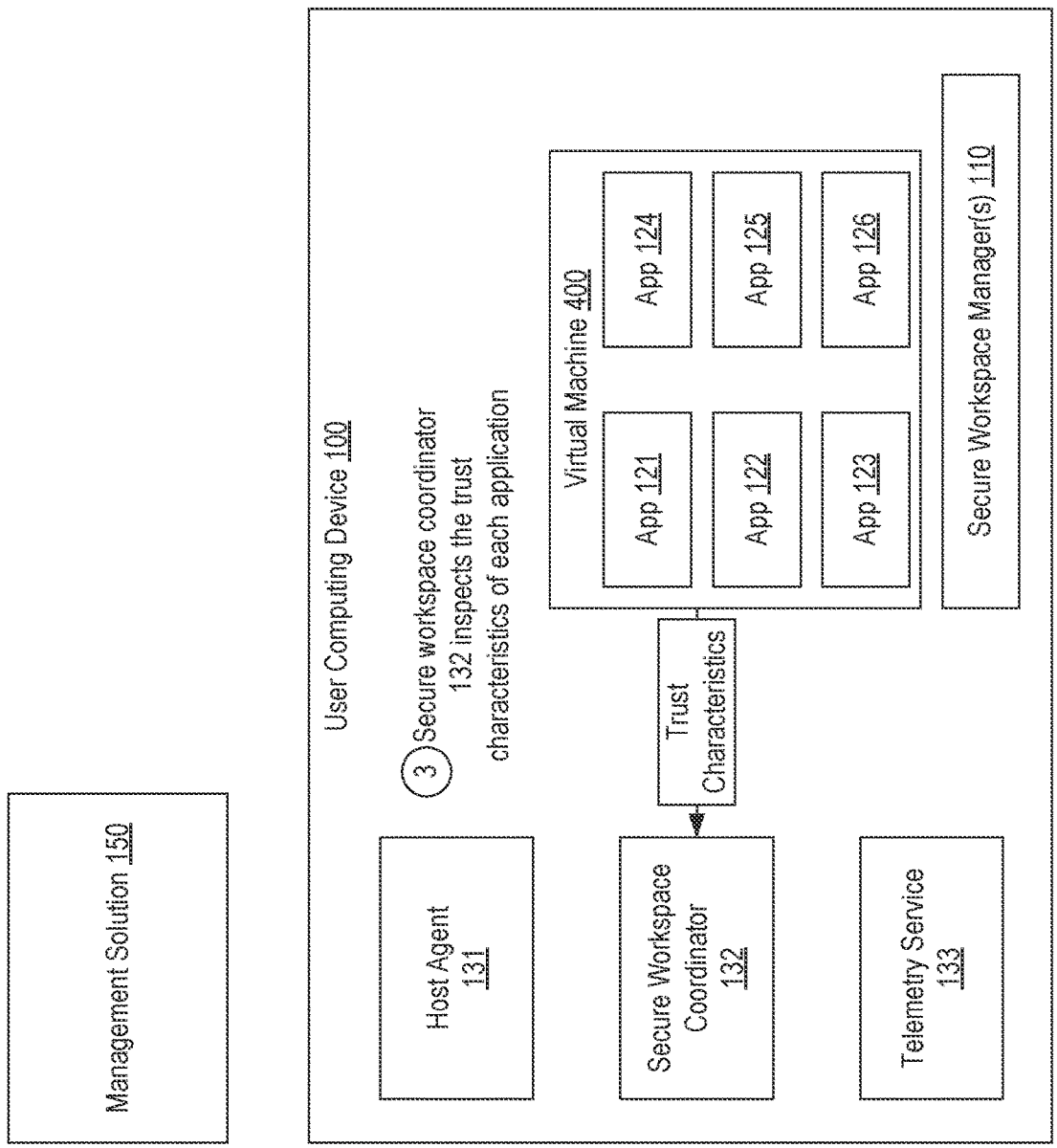

Turning to FIG. 4C, in step 3, secure workspace coordinator 132 can inspect the trust characteristics of each of applications 121-126 as they execute within virtual machine 400. For example, secure workspace coordinator 132, possibly in conjunction with a workspace agent executing within virtual machine 400, could determine whether each application is validly signed or is from a trusted source, the type of filesystem access the application requires, the privilege level the application requires (e.g., user, system, root, etc.), or any other trust-related characteristic.

Figure 4D:
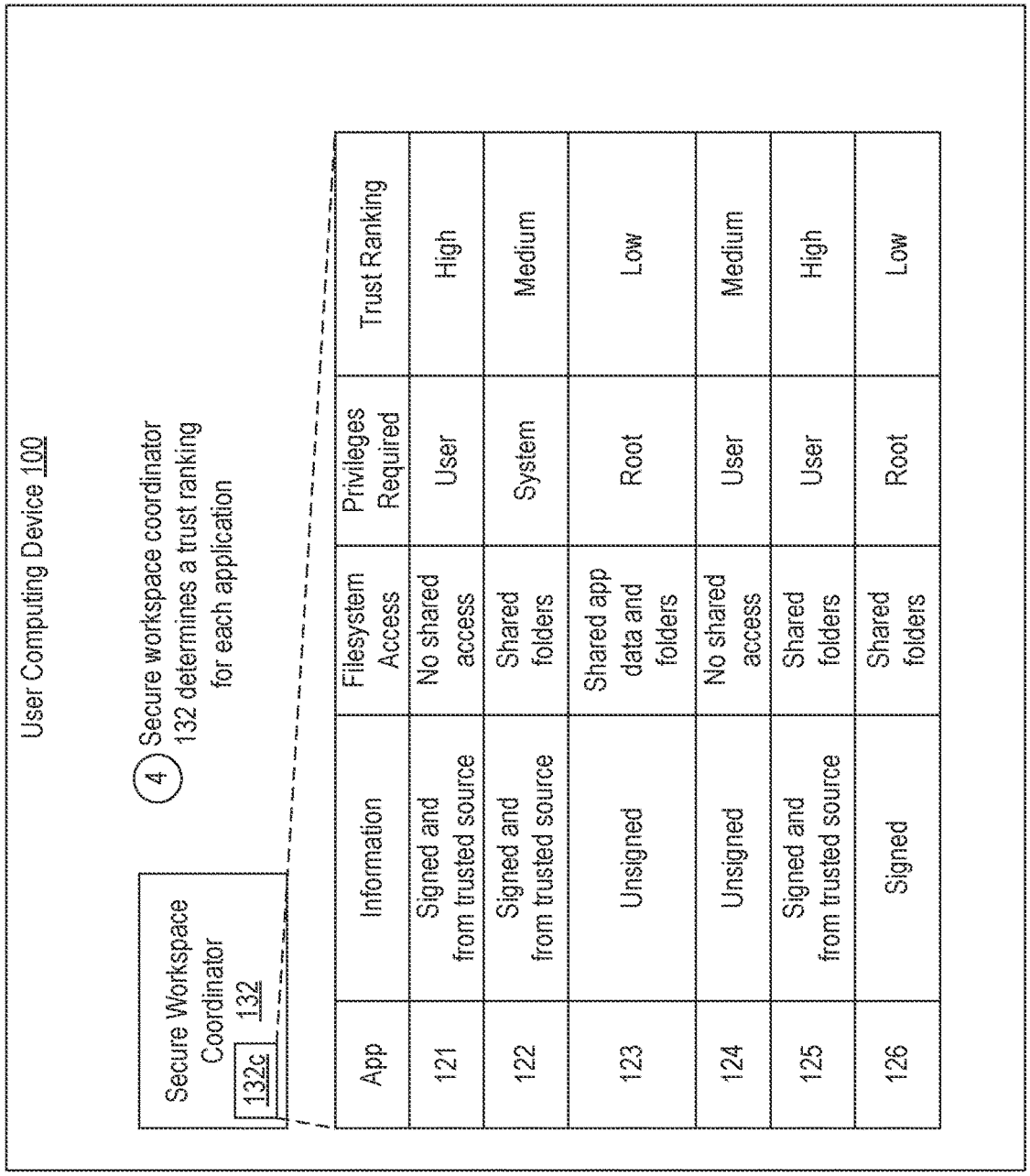

Turning to FIG. 4D, in step 4, secure workspace coordinator 132 can determine a trust ranking for each application based on the trust characteristics. As one example, FIG. 4D shows that secure workspace coordinator 132 has determine that application 121 has a high trust ranking because it is signed and from a trusted source, has no shared access to the filesystem, and needs only user privileges.

Figure 4E:
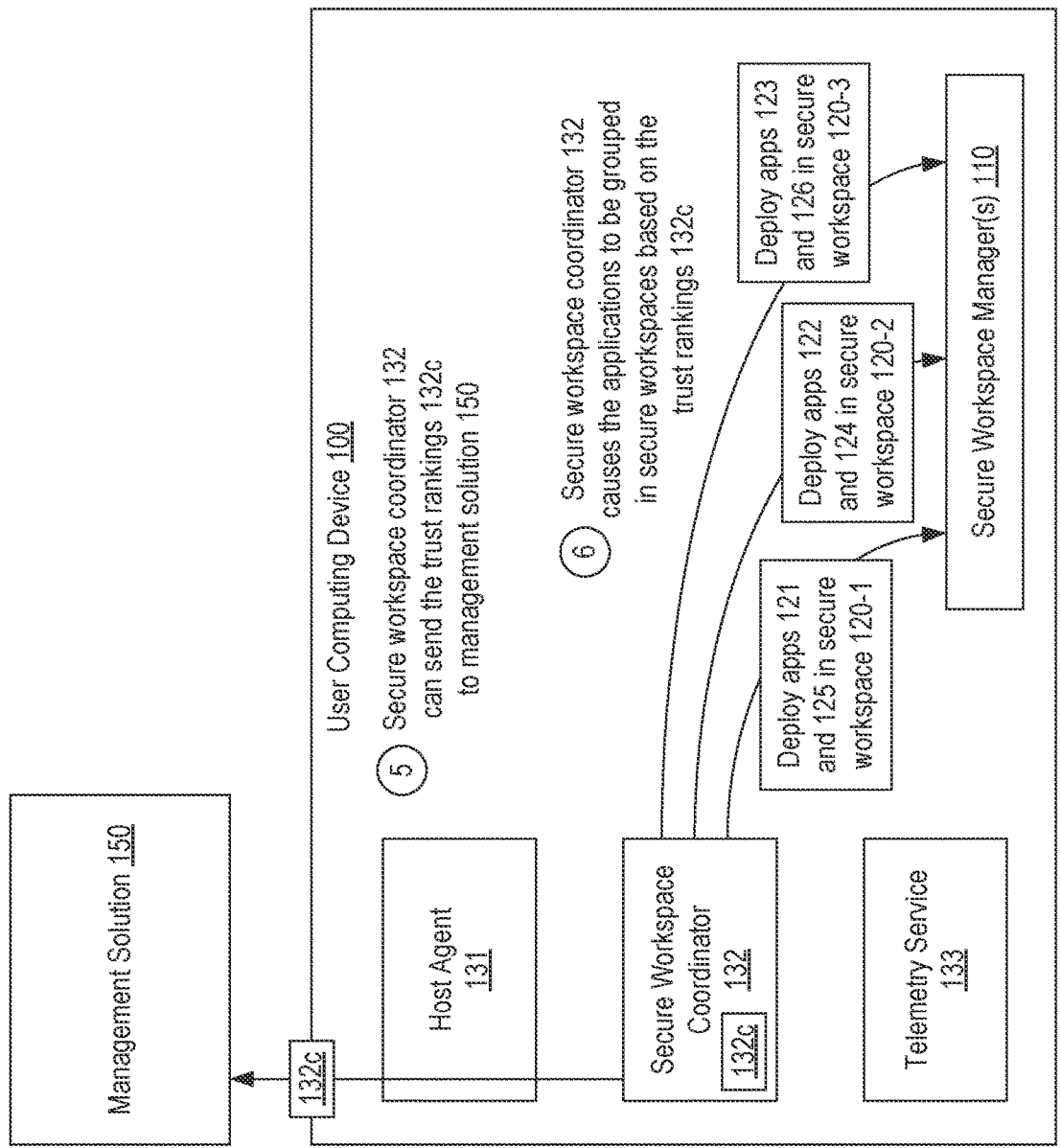

Turning to FIG. 4E, in step 5, secure workspace coordinator 132 can send the trust rankings 132c to management solution 150 (e.g., via host agent 131) so that management solution 150 may provide the trust rankings 132c to secure workspace coordinator 132 during a subsequent boot of user computing device 100 and/or to an instance of secure workspace coordinator 132 running on another user computing device 100 on which the same or similar set of applications be may deployed.

In step 6, secure workspace coordinator 132 can cause the applications to be grouped in secure workspaces based on the trust rankings 132c. For example, because applications 121 and 125 each have a high trust ranking, secure workspace coordinator 132 can interface with secure workspace manager(s) 110 to cause applications 121 and 125 to be deployed together in secure workspace 120-1 that provided low security. Similarly, because applications 122 and 124 each have a medium trust ranking, secure workspace coordinator 132 can interface with secure workspace manager(s) 110 to cause applications 122 and 124 to be deployed together in secure workspace 120-2 that provides medium security. Additionally, because applications 123 and 126 each have a low trust ranking, secure workspace coordinator 132 can interface with secure workspace manager(s) 110 to cause applications 123 and 126 to be deployed together in secure workspace 120-3 that provides high security.

Figure 4F:
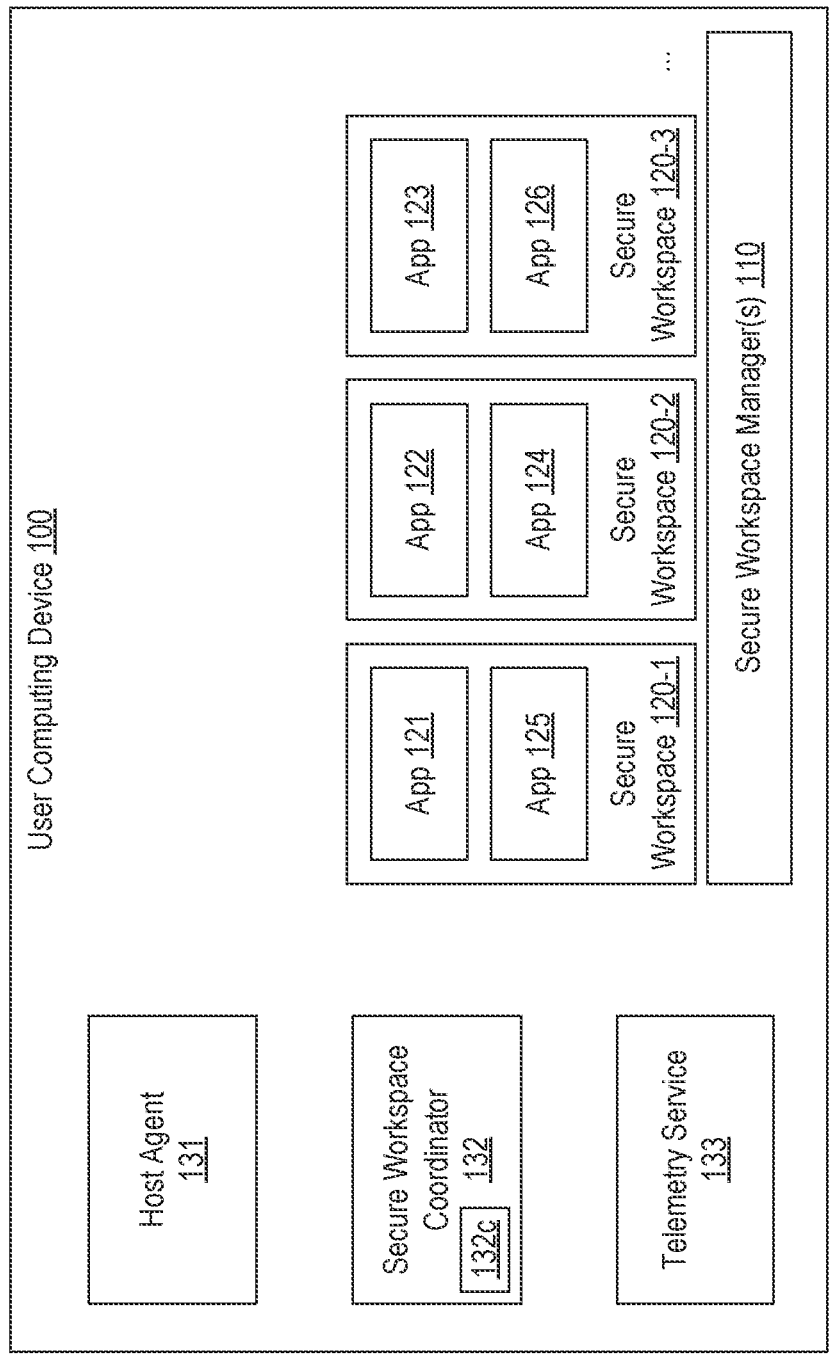

Turning to FIG. 4F, each of applications 121-126 are now grouped in the secure workspace in accordance with the trust rankings 132c. Secure workspace coordinator 132 can be configured to continue monitoring trust characteristics of the applications and to migrate them to the appropriate secure workspace if their trust rankings are changed.

In some embodiments, secure workspace coordinator 132 may leverage machine learning techniques to enhance the grouping of applications in any of the above-described examples. For example, secure workspace coordinator 132 could provide the resource utilization to a machine learning solution to obtain predictions for the resource-based secure workspace recommendations 132b.

In summary, embodiments of the present invention allow a user's applications to be intelligently and automatically grouped within secure workspaces. This grouping can be based on peripheral usage, resource utilization, and/or trust.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for automatically grouping applications in a secure workspace environment, the method comprising:
   executing a host agent and secure workspace coordinator on a user computing device;
   in response to a user logging in to the user computing device, sending, by the host agent, a first request to a management solution, the first request requesting a list of applications to be made available to the user on the user computing device;
   receiving, by the host agent and in response to the first request, the list of applications to be made available to the user on the user computing device;
   sending, by the host agent, the list of applications to the secure workspace coordinator;
   prior to deploying the applications in the list of applications, evaluating, by the secure workspace coordinator, an import address table of each of the applications to determine from the import address table which peripherals the respective application uses;
   based on the evaluation of the import address tables of the applications, selecting a first secure workspace and a second secure workspace for deploying the applications on the user computing device, the first secure workspace comprising a first sandbox and the second secure workspace comprising a second sandbox;
   based on the evaluation of the import address tables of the applications, selecting a first set of the applications to be deployed in the first secure workspace and a second set of the applications to be deployed in the second secure workspace, wherein the first set of the applications are selected to be deployed in the first secure workspace in response to determining from the evaluation that each application in the first set of applications uses a first set of one or more peripherals and the second set of the applications are selected to be deployed in the second secure workspace in response to determining from the evaluation that each application in the second set of applications uses a second set of one or more peripherals different from the first set of one or more peripherals;

causing the first secure workspace to be deployed on the user computing device;

causing the first set of one or more peripherals to be accessible within the first secure workspace;

causing the second secure workspace to be deployed on the user computing device;

causing the second set of one or more peripherals to be accessible within the second secure workspace;

causing the first set of applications to be deployed in the first secure workspace to thereby cause each application in the first set of applications to execute in the first sandbox and therefore be isolated from applications and services executing outside the first sandbox while having access to the first set of one or more peripherals; and causing the second set of applications to be deployed in the second secure workspace to thereby cause each application in the second set of applications to execute in the second sandbox and therefore be isolated from applications and services executing outside the second sandbox while having access to the second set of one or more peripherals.

2. The method of claim 1, further comprising:
creating peripheral association data defining which peripherals the applications use and sharing the peripheral association data with a management solution.

3. The method of claim 2, further comprising:
in conjunction with the user subsequently logging in to the user computing device, performing the following:
obtaining the peripheral association data from the management solution;
using the peripheral association data to determine which peripherals the applications use;
grouping the applications into two or more groups based on the peripherals that the applications use as determined from the peripheral association data; and
deploying each of the two or more groups in a separate secure workspace based on the peripherals that the applications use.

4. The method of claim 1, further comprising:
migrating a first application in the first set of applications from the first secure workspace to a different secure workspace in response to detecting an updated peripheral usage of the first application.

5. The method of claim 1, further comprising:
monitoring resource utilization of the applications in the first and second sets; and
regrouping the applications in secure workspaces based on the resource utilization.

6. The method of claim 5, wherein the resource utilization comprises utilization of one or more of a network, a graphics processing unit, a trusted platform module, or a virtual private network.

7. The method of claim 5, further comprising:
migrating a first application in the first set of applications from the first secure workspace to a different secure workspace in response to detecting an updated resource utilization of the first application.

8. The method of claim 1, further comprising:
determining trust characteristics of the applications in the first and second sets; and
regrouping the applications in secure workspaces based on the trust characteristics.

9. The method of claim 8, wherein the trust characteristics include one or more of whether an application is signed, a source of the application, filesystem access that the application requires, or privileges that the application requires.

10. The method of claim 9, wherein regrouping the applications in secure workspaces based on the trust characteristics comprises grouping applications with a high trust level and applications with a low trust level in different secure workspaces.

11. The method of claim 8, further comprising:
migrating a first application in the first set of applications from the first secure workspace to a different secure workspace based on updated trust characteristics.

12. The method of claim 1, wherein the first and second sandboxes are different types of sandboxes.

13. One or more computer storage media storing computer executable instructions which when executed implement a method for automatically grouping applications in a secure workspace environment, the method comprising:
in response to a user logging in to the user computing device, sending, by the host agent, a first request to a management solution, the first request requesting a list of applications to be made available to the user on the user computing device;
receiving, by the host agent and in response to the first request, the list of applications to be made available to the user on the user computing device;
sending, by the host agent, the list of applications to the secure workspace coordinator;
prior to deploying the applications in the list of applications, evaluating, by the secure workspace coordinator, an import address table of each of the applications to determine from the import address table which peripherals the respective application uses;
based on the evaluation of the import address tables of the applications, selecting a first secure workspace and a second secure workspace for deploying the applications on the user computing device, the first secure workspace comprising a first sandbox and the second secure workspace comprising a second sandbox;
based on the evaluation of the import address tables of the applications, selecting a first set of the applications to be deployed in the first secure workspace and a second set of the applications to be deployed in the second secure workspace, wherein the first set of the applications are selected to be deployed in the first secure workspace in response to determining from the evaluation that each application in the first set of applications uses a first set of one or more peripherals and the second set of the applications are selected to be deployed in the second secure workspace in response to determining from the evaluation that each application in the second set of applications uses a second set of one or more peripherals different from the first set of one or more peripherals;
causing the first secure workspace to be deployed on the user computing device;
causing the first set of one or more peripherals to be accessible within the first secure workspace;
causing the second secure workspace to be deployed on the user computing device;
causing the second set of one or more peripherals to be accessible within the second secure workspace;
causing the first set of applications to be deployed in the first secure workspace to thereby cause each application in the first set of applications to execute in the first sandbox and therefore be isolated from applications and services executing outside the first sandbox while having access to the first set of one or more peripherals; and causing the second set of applications to be deployed in the second secure workspace to thereby cause each application in the second set of applications to execute in the second sandbox and therefore be isolated from applications and services executing outside the second sandbox while having access to the second set of one or more peripherals.

14. The computer storage media of claim 13, wherein the method further comprises:

based on the evaluation of the import address tables of the applications, selecting a third secure workspace comprising a third sandbox;

based on the evaluation of the import address tables of the applications, selecting a third set of the applications to be deployed in a third secure workspace, wherein the third set of the applications are selected to be deployed in the third secure workspace in response to determining from the evaluation that each application in the third set of applications does not use any peripherals, causing the third secure workspace to be deployed on the user computing device; and causing the third set of applications to be deployed in the third secure workspace to thereby cause each application in the third set of applications to execute in the third sandbox and therefore be isolated from applications and services executing outside the third sandbox.

15. The computer storage media of claim 13, wherein the method further comprises:

creating peripheral association data defining which peripherals the applications use and sharing the peripheral association data with a management solution.

16. The computer storage media of claim 15, wherein the method further comprises:

in conjunction with the user subsequently logging in to the user computing device, performing the following:
obtaining the peripheral association data from the management solution;
using the peripheral association data to determine which peripherals the applications use;
grouping the applications into two or more groups based on the peripherals that the applications use as determined from the peripheral association data; and
deploying each of the two or more groups in a separate secure workspace based on the peripherals that the applications use.

17. The computer storage media of claim 13, wherein the method further comprises:

monitoring resource utilization of the applications in the first and second sets of applications; and
regrouping the applications in secure workspaces based on the resource utilization.

18. The computer storage media of claim 13, wherein the method further comprises:

determining trust characteristics of the applications in the first and second sets of applications; and
regrouping the applications in secure workspaces based on the trust characteristics.

19. A user computing device comprising:
one or more processors; and
one or more computer storage media storing computer executable instructions which when executed by the one or more processors implement a method for automatically grouping applications in a secure workspace environment, the method comprising:

in response to a user logging in to the user computing device, sending, by the host agent, a first request to a management solution, the first request requesting a list of applications to be made available to the user on the user computing device;

receiving, by the host agent and in response to the first request, the list of applications to be made available to the user on the user computing device;

sending, by the host agent, the list of applications to the secure workspace coordinator;

prior to deploying the applications in the list of applications, evaluating, by the secure workspace coordinator, an import address table of each of the applications to determine from the import address table which peripherals the respective application uses;

based on the evaluation of the import address tables of the applications, selecting a first secure workspace and a second secure workspace for deploying the applications on the user computing device, the first secure workspace comprising a first sandbox and the second secure workspace comprising a second sandbox;

based on the evaluation of the import address tables of the applications, selecting a first set of the applications to be deployed in the first secure workspace and a second set of the applications to be deployed in the second secure workspace, wherein the first set of the applications are selected to be deployed in the first secure workspace in response to determining from the evaluation that each application in the first set of applications uses a first set of one or more peripherals and the second set of the applications are selected to be deployed in the second secure workspace in response to determining from the evaluation that each application in the second set of applications uses a second set of one or more peripherals different from the first set of one or more peripherals;

causing the first secure workspace to be deployed on the user computing device;

causing the first set of one or more peripherals to be accessible within the first secure workspace;

causing the second secure workspace to be deployed on the user computing device;

causing the second set of one or more peripherals to be accessible within the second secure workspace;

causing the first set of applications to be deployed in the first secure workspace to thereby cause each application in the first set of applications to execute in the first sandbox and therefore be isolated from applications and services executing outside the first sandbox while having access to the first set of one or more peripherals; and causing the second set of applications to be deployed in the second secure workspace to thereby cause each application in the second set of applications to execute in the second sandbox and therefore be isolated from applications and services executing outside the second sandbox while having access to the second set of one or more peripherals.

\* \* \* \* \*